(12) United States Patent
Yezrielev et al.

(10) Patent No.: US 6,280,519 B1
(45) Date of Patent: Aug. 28, 2001

(54) ENVIRONMENTALLY PREFERRED FLUIDS AND FLUID BLENDS

(75) Inventors: Albert Ilya Yezrielev, Houston, TX (US); Richard Henry Schlosberg, Bridgewater; George Andrew Knudsen, Scotch Plains, both of NJ (US); Thomas Marshall Larson, Houston, TX (US)

(73) Assignee: Exxon Chemical Patents Inc., Houston, TX (US)

( * ) Notice: Subject to any disclaimer, the term of this patent is extended or adjusted under 35 U.S.C. 154(b) by 0 days.

(21) Appl. No.: 09/288,055

(22) Filed: Apr. 7, 1999

Related U.S. Application Data

(60) Provisional application No. 60/087,150, filed on May 29, 1998, and provisional application No. 60/084,347, filed on May 5, 1998.

(51) Int. Cl.$^7$ .............. C08K 5/00; C08K 5/04; C08K 5/05; C08K 5/10; C08K 5/101
(52) U.S. Cl. .......... 106/311; 106/236; 106/237; 106/238; 106/239; 252/364; 244/285
(58) Field of Search .................. 106/236, 237, 106/238, 239, 311; 252/364; 244/285

(56) References Cited

U.S. PATENT DOCUMENTS

| | | | |
|---|---|---|---|
| 3,505,231 | 4/1970 | Oliphant ...................... 252/62.1 |
| 3,711,400 | 1/1973 | Cole et al. ...................... 210/21 |
| 3,745,125 | 7/1973 | Marranci et al. ............. 252/312 |
| 4,131,521 | 12/1978 | Cipris et al. ................... 204/59 |
| 4,148,763 | 4/1979 | Bryson ........................ 260/2.3 |
| 4,318,862 | 3/1982 | Romano et al. ............... 260/463 |
| 4,474,798 | 10/1984 | Inagi et al. .................... 424/274 |
| 4,593,080 | 6/1986 | Bouboulis et al. ............ 526/208 |
| 4,680,133 | 7/1987 | Ward ........................... 252/153 |
| 5,004,480 | 4/1991 | Kanne ........................... 44/387 |
| 5,032,144 | 7/1991 | Jessup et al. ................... 44/384 |
| 5,044,480 | 9/1991 | Taureg ....................... 192/58 B |
| 5,183,920 | 2/1993 | Myers ........................... 558/277 |
| 5,194,656 | 3/1993 | Ancillotti et al. ............. 558/277 |
| 5,210,269 | 5/1993 | Di Muzio et al. ............. 558/277 |
| 5,214,185 | 5/1993 | Nishihira et al. ............. 558/277 |
| 5,240,544 | 8/1993 | Tanimoto et al. ............ 156/331.6 |
| 5,292,917 | 3/1994 | Nishihira et al. ............. 558/277 |
| 5,300,154 | 4/1994 | Ferber et al. .................. 134/26 |
| 5,306,681 | 4/1994 | Schorfheide et al. ........... 502/22 |
| 5,454,878 | 10/1995 | Bala et al. .................... 134/10 |
| 5,458,780 | 10/1995 | Evans .......................... 210/634 |
| 5,459,122 | 10/1995 | Ford et al. ................... 504/116 |
| 5,464,557 | 11/1995 | Ferber et al. ................. 252/170 |
| 5,514,829 | 5/1996 | Nishihira et al. ............. 558/277 |
| 5,516,450 | 5/1996 | Williams et al. ........... 252/174.15 |
| 5,516,623 | 5/1996 | Schlosser et al. ............. 430/306 |
| 5,534,648 | 7/1996 | Nishihira et al. ............. 558/277 |
| 5,536,864 | 7/1996 | Paret et al. ................... 558/277 |
| 5,543,548 | 8/1996 | Landscheidt et al. ......... 558/277 |
| 5,552,080 | * 9/1996 | Bolmer ........................ 510/412 |
| 5,561,094 | 10/1996 | Saleh et al. ................... 502/152 |
| 5,565,603 | 10/1996 | Saleh et al. ................... 558/275 |
| 5,578,652 | 11/1996 | Blanpied et al. .............. 521/107 |
| 5,599,357 | 2/1997 | Leeper ........................... 44/355 |
| 5,609,678 | * 3/1997 | Bergman ....................... 106/311 |
| 5,631,305 | 5/1997 | Werner et al. ................ 521/114 |
| 5,631,396 | 5/1997 | Nishihira et al. ............. 558/277 |
| 5,665,788 | 9/1997 | Werner et al. ................ 521/114 |
| 5,698,144 | 12/1997 | Wilkes et al. .................. 264/50 |
| 5,707,784 | 1/1998 | Oikawa et al. ................ 430/313 |
| 5,723,509 | 3/1998 | Werner et al. ................ 521/114 |
| 5,749,956 | 5/1998 | Fisher et al. ............... 106/287.28 |
| 5,773,403 | 6/1998 | Hijino et al. .................. 510/411 |
| 6,048,471 | 4/2000 | Henry ........................... 252/364 |

FOREIGN PATENT DOCUMENTS

| | | |
|---|---|---|
| WO 98/10033 | 3/1998 | (WO) . |
| WO 98/42774 | 10/1998 | (WO) . |
| WO 99/13836 | 3/1999 | (WO) . |

OTHER PUBLICATIONS

"Kinetics of the reactions of OH Radicals with Some Oxygeneated Volatile Organic Compounds under Simulated Atmospheric Conditions," 1998, Benedicte Picquet, Laboratoire Interuniversitaire des Systemes Atmospheriques, pp. 839–847.

"Uncertainties and Research Needs in Quantifying VOC Reactivity For Stationary Source Emission Controls," 1995, William P. Carter, 8 pages.

"Uncertainties and Research Needs in Quantifying VOC Reactivity For Stationary Source Emission Controls," 1996, William P. Carter, 21 pages.

"Program Calculates Solvent Properties and Solubility Parameters," 9/89, M.F. Dante et al., Modern Paint and Coatings, 2 pages.

"Scientific Basis for the VOC Reactivity Issues Raised by Section 183(e) of the Clean Air Act Amendments of 1990," 10/96, Basil Dimitriades, Journal of the Air & Waste Management Association, vol. 46, pp 963–970.

"Atmospheric Chemistry of Dimethyl Carbonate: Reaction with OH Radicals, UV Spectra et al.," 1997, M. Bilde et al., Advance ACS Abstracts, pp. 3514–3525.

"Updated Maximum Incremental Reactivity Scale For Regulatory Applications," Aug. 6, 1998, William P. Carter, 73 pages.

"Photochemical Ozone Creation Potentials For Oxygenated Volatile Organic Compounds: Sensitivity To Variations In Kinetic And Mechanistic Parameters," (1999) Michael E. Jenkin et al., Atmospheric Environment, pp. 1275–1293.

"Mechanisms For The Chlorine Atom Initiated Oxidation OF Dimethoxymethane And 1,2–Dimethoxyethane In The Presence OF $NO_x$," 1999, J. Wenger et al, Chemosphere, vol. 38, No. 6, pp. 1197–1204.

(List continued on next page.)

Primary Examiner—Mark L. Bell
Assistant Examiner—Michael J. DiVerdi

(57) ABSTRACT

The invention concerns fluids that have a low reactivity with respect to ozone formation, blends thereof, and the replacement of conventional industrial solvents with said fluid or fluid blends in order to reduce troposheric ozone formation.

36 Claims, No Drawings

OTHER PUBLICATIONS

U.S. application No. 09/305,548, Yezrielev et al., filed May 5, 1999.

"Development of Ozone Reactivity Scales for Volatile Organic Compounds," 7/94, William P.L. Carter, Air & Waste, vol. 44 pp. 881–899.

"Computer Modeling Of Environmental Chamber Measurements Of Maximum Incremental Reactivities Of Volatile Organic Compounds," 1995, William P.L. Carter, Atmospheric Environment, vol. 29, No. 18, pp. 2513–2527.

"A Detailed Mechanism For The Gas–Phase Atmospheric Reactions Of Organic Compounds," 1990, William P.L. Carter, Atmospheric Environment, vol. 24, No. 3, pp. 481–518.

"Impact of Consumer Products on California's Air Quality," James M. Lyons et al., 7/97, 37 pages.

"Kinetics of Alkaline Hydrolysis of Organic Esters and Amides in Neutrally–Buffered Solution," Bruce A. Robinson et al., (1990) International Journal of Chemical Kinetics, vol. 22, 431–448.

"Review of Dimethyl Carbonate (DMC) Manufacture and Its Characteristics as a Fuel Additive," Michael A. Pacheco et al., 1997, Energy & Fuels, vol. 11, No. 1, pp 2–29.

"An Experimental and Modeling Study of the Photochemical Ozone Reactivity of Acetone," William P.L. Carter et al., Dec. 10, 1993, pp. 1–77.

"Petition of the Aluminum Association, Inc. for the exemption of Certain N–Alkanes From Regulation as Volatile Organic Compounds Under the Clean Air Act," Robert P. Strieter, Nov. 25, 1996, 24 pages.

"Investigation of Atmospheric Ozone Formation Potentials of $c_{12}$ —$C_{16}$ N–Alkanes" William P.L. Carter et al., Jul. 15, 1996, 46 pages.

"First–order sensitivity and uncertainty analysis for a regional–scale gas–phase chemical mechanism," Dongfen Gao et al., Journal of Geophysical Research, Nov. 20, 1995, vol. 100, No. D11, pp. 23,153–12,166.

"California Air Resources Board Reactivity Assignments"— Nov. 14, 1991, Maximum Incremental Reactivity (MIR) and Maximum Ozone Incremental Reactivity (MOIR) *in grams ozone/gram), 5 pp.

"Air Quality: Revision to Definition of Volatile Organic Compounds–Exclusion of Methyl Acetate" Federal Register, vol. 62, No. 164, Aug. 25, 1997, pp. 44926–44928.

"Urban Ozone Control and Atmospheric Reactivity of Organic Gases," A. Russell et al., Jul. 27, 1997, Science, vol. 269, pp. 491–495.

"Uncertainties in Incremental Reactivities of Volatile Organic Compounds," Yueh–Jiun Yang et al., Environmental Science & Technology, vol. 29, No. 5, 1995, pp. 1336–1345.

"Mechanisms for Atmospheric Chemistry Sensitivity, Uncertainty and Chemical Kinetic Data," William R. Stockwell et al., Eurotrac Newsletter 16/95, pp. 2–7. 1995.

"Atmospheric Processes," W.P.L. Carter, 1994, 10 pages.

"VOCs and Regulatory Folly," Willy Peterson, 1/98, Paint & Coatings Industry, pp. 84–99.

"Environmental Chamber Study Of Maximum Incremental Reactivities of Volatile Organic Compounds," William P.L. Carter et al., 1995, Atmospheric Environment, vol. 29, No. 18, pp. 2499–2511.

* cited by examiner

ENVIRONMENTALLY PREFERRED FLUIDS AND FLUID BLENDS

CROSS-REFERENCE TO RELATED APPLICATIONS

This application claims the benefit of priority of U.S. Provisional Application Ser. No. 60/084,347, filed May 5, 1998, and No. 60/087,150, filed May 29, 1998.

FIELD OF THE INVENTION

This invention relates to the selection and use of environmentally preferred fluids and fluid blends which exhibit low or reduced reactivity with respect to ozone formation. These environmentally preferred fluids and fluid blends are useful in a number of applications, particularly as industrial solvents, and allow formulators an effective means to improve the environmental preference of their formulations or products.

BACKGROUND OF THE INVENTION

Fluid applications are broad, varied, and complex, and each application has its own set of characteristics and requirements. Proper fluid selection and fluid blend development have a large impact on the success of the operation in which the fluid is used. For instance, in a typical industrial coatings operation, a blend of several fluids is used in order to get an appropriate evaporation profile. Such a blend must also provide the appropriate solvency properties, including formulation stability, viscosity, flow/leveling, and the like. The fluid blend choice also affects the properties of the dry film, such as gloss, adhesion, and the like. Moreover, these and other properties may further vary according to the application method (e.g., spray-on), whether the substrate is original equipment (OEM), refinished, etc., and the nature of the substrate coated.

Other operations involving the use of fluids and fluid blends include cleaning, printing, delivery of agricultural insecticides and pesticides, extraction processes, use in adhesives, sealants, cosmetics, and drilling muds, and countless others. The term "fluid" encompasses the traditional notion of a solvent, but the latter term no longer adequately describes the possible function of a fluid or blend in the countless possible operations. As used herein the term "fluid" includes material that may function as one or more of a carrier, a diluent, a surface tension modifier, dispersant, and the like, as well as a material functioning as a solvent, in the traditional sense of a liquid which solvates a substance (e.g., a solute).

The term "industrial solvent" applies to a class of liquid organic compounds used on a large scale to perform one or more of the numerous functions of a fluid in a variety of industries. Relatively few of the large number of known organic compounds that could be used as fluids find use as industrial solvents. Fluids that are used in large quantities have heretofore been selected because they can be produced economically and have attractive safety and use characteristics in manufacturing, consumer and commercial environments. Examples of important industrial solvents are toluene, the xylenes, and mineral spirits, n-butyl acetate, methyl ethyl ketone (MEK), methyl isobutyl ketone (MIK), and butanol.

In addition to the problems with fluid and fluid blend selection mentioned at the outset, there is also the problem that, in most applications, at least some of the fluid evaporates and can escape into the environment. In some applications, such as in certain coating operations, it is intended that the fluid evaporate. This evaporative property causes environmental problems. Although many industrial coating operations, such as in original equipment manufacturing (OEM) and auto refinishing, utilize control equipment to capture >95% solvent emissions, nevertheless at least some inevitably enters the atmosphere.

The United States Environmental Protection Agency (EPA) has developed National Ambient Air Quality Standards (NAAQS) for six pollutants: ozone, nitrogen oxides ($NO_x$), lead, carbon monoxide, sulfur dioxide and particulates. Of all the NAAQS standards, ozone non-attainment has the greatest impact on solvent operations.

Solvents typically are volatile organic compounds (VOC), which are involved in complex photochemical atmospheric reactions, along with oxygen and nitrogen oxides ($NO_x$) in the atmosphere under the influence of sunlight, to produce ozone. Ozone formation is a problem in the troposphere (low atmospheric or "ground-based"), particularly in an urban environment, since it leads to the phenomenon of smog. Since VOC emissions are a source of ozone formation, industrial operations and plants using solvents are heavily regulated to attain ozone compliance. As different regulations have been adopted, the various approaches to controlling pollution have evolved. Certain early regulations controlled solvent composition, while later regulations primarily concerned overall VOC reduction. A more recent regulation has combined VOC reduction with composition constraints. While the traditional source of emission reduction is large stationary industrial facilities, the EPA and other governmental entities have turned increasingly to consumer and commercial products for reduction in their solvent usage as an additional means to lower VOC emission and therefore ozone formation.

The EPA has developed a list of compounds with negligible photochemical reactivity, such as methane, ethane, acetone, and various halogenated compounds. The agency has determined that these compounds do not contribute appreciably to ozone formation, and granted them VOC exempt status. Numerous government and trade publications discuss VOC's, and information is readily available on the internet. See, for instance, http://www.paintcoatings.netVOCW97.html.

Various measurements of reactivity with respect to ozone formation are known. For instance, reactivity can be measured in environmental smog chambers, or they may be calculated using computer airshed models. See, for instance, Dr. William P. L. Carter, "Uncertainties and Research Needs in Quantifying VOC Reactivity for Stationary Source Emission Controls", presented at the California Air Resources Board (CARB) Consumer Products Reactivity Subgroup Meeting, Sacramento, Calif. (Oct. 17, 1995).

There has also been developed a "$K^{OH}$ scale", which provides a relative scale of the reactivity of VOC with the OH radicals involved in the complex reactions that produce ozone. See, for instance, Picquet et al., *Int J. Chem. Kinet.* 30, 839–847 (1998); Bilde et al., *J. Phys. Chem. A* 101, 3514–3525 (1997).

Numerous other reactivity scales are known and new reactivity scales are constantly being developed. Since this is a rapidly changing area of research, the most up-to-date information is often obtained via the internet. One example is Airsite, the Atmospheric Chemistry International Research Site for Information and Technology Exchange, sponsored by the University of North Carolina and the University of Leeds, at http://airsite.unc.edu.

Another way to measure the reactivity of a chemical in ozone formation is by using a technique developed by Dr. Carter (supra) at the Center for Environmental Research and Technology (CERT), University of California at Riverside. The CERT technique measures "incremental reactivities", the incremental amount of ozone that is produced when the chemical is added to an already polluted atmosphere.

Two experiments are conducted to measure the incremental reactivity. A base case experiment measures the ozone produced in an environmental smog chamber under atmospheric conditions designed to represent a polluted atmosphere. The second experiment called "the test case" adds the chemical to the "polluted" smog chamber to determine how much more ozone is produced by the newly added chemical. The results of these tests under certain conditions of VOC and nitrogen oxide ratios are then used in mechanistic models to determine the Maximum Incremental Reactivities (MIR), which is a measure of ozone formation by the compound.

The State of California has adopted a reactivity program for alternative fuels based on this technique and the EPA has exempted several compounds due to studies conducted by CERT. See, for instance, Federal Register 31,633 (Jun. 16, 1995) (acetone); 59 Federal Register 50,693 (Oct. 5, 1994) (methyl siloxanes), Federal Register 17,331 (Apr. 9, 1998) (methyl acetate). CARB and EPA have adopted a weight average MIR for regulatory purposes, wherein the weight average MIR of a solvent blend is calculated by summing the product of the weight percent of each solvent and its respective MIR value.

A list of compounds and their MIR values is available in the Preliminary Report to California Air Resources Board, Contract No. 95-308 William P. L. Carter, Aug. 6,1998. A table of known MIR values may be found on the internet at http://helium.ucr.edu/~carter/index.html. CERT obtains other incremental reactivities by varying the ratios of VOC and nitrogen oxides. A detailed explanation of the methods employed and the determination of incremental reactivities and MIR scale may be found in the literature. See, for instance, *International Journal of Chemical Kinetics,* 28, 497–530 (1996); *Atmospheric Environment,* 29, 2513–2527 (1995), and 29, 2499–2511 (1995); and *Journal of the Air and Waste Management Association,* 44, 881–899 (1994); *Environ. Sci. Technol.* 23, 864 (1989). Moreover, various computer programs to assist in calculating MIR values are available, such as the SAPRC97 model, at http:1/helium.ucr.edu/~carter/saprc97.htm.

Any of these aforementioned scales could be used for regulatory purposes, however the MIR scale has been found to correlate best to peak ozone formation in certain urban areas having high pollution, such as the Los Angeles basin. MIR values can be reported as the absolute MIR determined by the CERT method or as a relative MIR. One common relative MIR scale uses the Reactive Organic Gas (ROG) in the base case as a benchmark. The Absolute Reactivity ROG is 3.93 g $O_3$ per gram ROG. This value is then the divisor for the absolute MIR of other VOCs, so each MIR is cited relative to ROG. All MIR values cited herein are relative to ROG=3.93.

Solvents currently viewed as essentially non-ozone producing are those which have reactivity rates in the range of ethane. Ethane has a measured reactivity based on the MIR method of 0.08. In fact, the EPA has granted a VOC exemption to certain solvents with reactivity values in this range including acetone (MIR=0.12) and methyl acetate (MIR=0.03).

However, the number of known materials having reactivities of 0.12 or less based on the MIR scale is relatively small. Moreover, it is a discovery of the present inventors that many if not most of the known fluids having acceptable reactivities with respect to ozone formation have other unfavorable performance characteristics, e.g., poor solvent properties, low flash point, inappropriate evaporative or volatility characteristics, unacceptable toxicity, unacceptable particulate matter formation, thermal or chemical instability (e.g., reactive to species other than $NO_x$, and more particularly reactivity in solution), and as such has limited, if any, applicability in industry. For example, ethane, having an excellent MIR=0.08, is a gas under ambient conditions and hence is a poor choice as an industrial solvent. Methyl acetate has an excellent MIR=0.03 but a low flash point of about −12° C.; acetone has an acceptable MIR=0.12 but is extremely flammable. As a further example, tertiary butyl acetate (t-butyl acetate) has an excellent MIR=0.04 but has limited thermal stability and is unstable to acid catalysts which may be present in an industrial operation.

Regarding particulate matter, the EPA has recently proposed standards for particulate matter under 2.5 microns in diameter ("PM2.5"). See 61 Federal Register 65638-65713 (Dec. 13, 1996). The proposal sets an annual limit, spatially averaged across designated air quality monitors, of 15 $\mu g/m^3$, and a 24-hour standard of 65 $\mu g/m^3$. Numerous discussions of this proposed standard are available on the internet, such as at http://www.cnie.org/nle/air~html, which cites numerous references (such as Wolf, "The Scientific Basis for a Particulate Matter Standard", Environmental Management (Oct., 26–31 1996)). As far as the present inventors are aware, the prior art has not addressed ways of meeting these proposed requirements, much less in meeting these requirements in conjunction with ozone reduction requirements.

Moreover, the present inventors have also discovered that in many applications, VOC exempt solvents cannot be used as a one-for-one replacement for conventional solvents. Rather the formulator must balance a number of performance factors to develop an acceptable solvent or solvent blend for a particular application. Some factors are more relevant than others for specific applications. Nevertheless, many performance factors are similar for a number of applications.

Numerous attempts have been made to utilize the concept of "environmentally friendly" fluids in practical applications. For instance, there are a number of cleaning and/or stripping formulations available that are said to overcome certain prior art environmental problems. Examples include a binary azeotrope of octamethyltrisiloxane with n-propoxypropanol (U.S. Pat. No. 5,516,450), hexamethyidisiloxane and azeotropes and other mixtures thereof (U.S. Pat. No. 5,773,403), a nonazeotropic mixture including a halocarbon and an oxygenated organic solvent component having at least 3 carbons, which may be, for instance, dimethylcarbonate (U.S. Pat. No. 5,552,080), and a composition comprising an amide and a dialkyl carbonate (U.S. Pat. No. 4,680,133).

In addition, there have been a number of patents and literature references to materials intended to replace chlorofluorocarbons (CFCs) as, for instance, blowing agents. These efforts address stratospheric ozone depletion, which is the opposite phenomenon addressed by the present invention. Examples include the use of dimethoxymethane and cyclopentane (U.S. Pat. Nos. 5,631,305; 5,665,788; and 5,723,509), cyclopentane (U.S. Pat. No. 5,578,652) and polyglycols (U.S. Pat. No. 5,698,144). Still further, a "non-ozone depleting" solvent comprising halogenated compounds and an aliphatic or aromatic hydrocarbon compound having 6–20 carbon atoms is disclosed in U.S. Pat. No. 5,749,956. Similarly, U.S. Pat. No. 5,004,480 describes a method for reducing the levels of air pollution resulting from the combustion of diesel fuel in engines comprising blending dimethyl carbonate (DMC) with diesel fuel and combusting the blended fuel in engines. U.S. Pat. No. 5,032,144 also discusses the addition of oxygenates, including dimethyl pivalate (methyl 1,1,1-trimethyl acetate) to gasoline (as octane boosters). The problems addressed by these patents do not relate to the problem of industrial solvent evaporation.

WO 98/42774 discloses a solvent-resin compositions which "do not contribute appreciably to the formation of ground based ozone". Organic solvents are selected based upon having "reaction rates with hydroxyl ion slower than ethane", and generally selected from halogenated solvents such as chlorobromomethane, methyl chloride, and the like. The only non-halogenated solvents that are suggested are n-alkanes ($C_{12}$–$C_{18}$), methyl and t-butyl acetate, acetone, dimethoxymethane, and mineral oils.

However, heretofore there has been no general solution to the problem of ground-based ozone formation that also provides for a fluid with appropriate performance attributes for an industrial solvent.

SUMMARY OF THE INVENTION

The present invention is directed to environmentally preferred fluids and fluid blends, their use as industrial solvents, and to a method of reducing ozone formation in a process wherein at least a portion of a fluid eventually evaporates.

The fluids and fluid blends of this invention have been selected by the present inventors for their actual or potential low reactivity in the complex photochemical atmospheric reaction with molecular oxygen ($O_2$) and nitrogen oxides ($NO_x$) to create ozone. Preferably the fluids selected are those having a reactivity with respect to tropospheric ozone formation, hereinafter referred to as "ozone formation potential" or OFP, similar to or less than that of ethane. In a preferred embodiment, a blend of fluids according to the present invention will have a weight average OFP similar to or less than that of ethane. It is preferred that the OFP be measured by the MIR scale.

It is preferred that the fluids and fluid blends also provide at least one other desirable performance property such as high flash point, low particulate formation, suitable evaporation rates, suitable solvency, low toxicity, high thermal stability, and chemical inertness with respect to non-ozone producing reactions, particularly with respect to acids which may be present in coating formulations.

In a particularly preferred embodiment, the fluids are used in a blend with known industrial solvents or other fluids which present an environmental problem with respect to OFP or lack one or more of the aforementioned desirable performance properties, so that the new fluid blends will have lower OFP than they would without the substituted low ozone formation reactivity fluid or have at least one of the aforementioned other desirable performance properties.

The present invention is also directed to a method of reducing ozone formation from atmospheric photochemical reactions in an application wherein a fluid eventually evaporates, at least partially, into the atmosphere, comprising replacing at least a portion of a fluid having a relatively higher OFP with a fluid having a relatively lower OFP. In the case where a blend results, it is preferred that the weighted average OFP of the blend be similar to or less than the OFP of acetone and more preferably similar to or less than that of ethane.

A fluid or fluid blend according to the present invention may be used in any process, e.g., any process using a fluid as a carrier, diluent, dispersant, solvent, and the like, on any scale, e.g., bench scale or laboratory scale, pilot plant scale, or industrial scale. It is preferred that the process be a stationary industrial process and it is preferred that the process is a non-combustion process. The present invention offers its greatest benefit from the standpoint of safety and health in large-scale industrial or commercial processes, particularly industrial coating processes or in formulations used in large quantities overall, albeit on a small scale for each individual use, e.g., by a consumer, such as in household paints, cosmetics, and the like. The ordinary artisan can readily differentiate between what is an industrial scale, pilot plant scale, and laboratory scale processes.

Accordingly, it is an object of the present invention to provide a method of selecting fluids and/or fluid blends for applications which release fluids into the air and wherein there is a need to inhibit ozone formation due to low atmospheric or ground-based (tropospheric) photochemical reactivity, in order to replace conventional solvents and/or solvent blends currently used in various compositions or processes.

It is another object of the present invention to provide a method of optimizing compositions comprising an evaporative fluid by selecting a fluid and/or fluid blend providing low OFP as well as at least one additional performance attribute selected from high flash point, low particulate formation, suitable evaporation rates, suitable solvency, low toxicity, high thermal and chemical stability.

Still another object of the present invention includes the selection of fluids and/or fluid blends providing low reactivity in ozone formation having compatibility with wide a range of organic compounds of different polarity and molecular weights to make the fluids and/or fluid blends suitable for a wide range of compositions.

It is yet another object of the present invention to provide a method of reducing ozone formation caused by the release into the troposphere of a fluid or fluid blend in a process utilizing the fluid or fluid blend, comprising replacing at least a portion of the fluid with another fluid having a lower OFP.

Yet still another object is to provide a method of reducing ground-based ozone formation due to fluid evaporation without resorting to expensive control equipment to capture all fluid emission into the environment.

These and other objects, features, and advantages will become apparent as reference is made below to a detailed description, preferred embodiments, and specific examples of the present invention.

DETAILED DESCRIPTION OF THE PREFERRED EMBODIMENTS

The fluids of this invention have been selected for their low or reduced ozone formation potential (low or reduced OFP). The OFP may be determined by any method providing a scale of reactivities of fluids in the complex photochemical atmospheric reaction to create ozone, such as the $K^{OH}$ scale, smog chamber studies, and modeling studies. By "low OFP" is meant that the fluid have an OFP similar to or less than that of acetone and more preferably similar to or less than that of ethane. By "reduced OFP" is meant that, in a process according to the present invention, a first fluid is replaced, in whole or in part, by a second fluid, the second fluid have an OFP lower than the first fluid. One of ordinary skill in the art can determine ozone reactivity of a material relative to another material, e.g., relative to acetone or ethane.

The OFP is preferably determined by smog chamber studies, modeling studies, or a combination thereof, but is more preferably determined by "incremental reactivity", and still more preferably by the MIR scale used herein, where the absolute MIR is divided by the ROG value of 3.93, as discussed above.

The OFP of a fluid is preferably similar to or less than that of acetone and more preferably similar to or less than that of ethane, but the benefits of the present invention are realized if ozone formation is reduced by replacing a first fluid with a second fluid, in whole or in part, wherein the OFP of the second fluid is reduced from that of the first fluid.

Since there is often some error associated with any determination of OFP, by "similar to" is meant that the OFP be no more than three times that determined for the reference compound (i.e., acetone or ethane). For instance, the value of MIR acetone is 0.12 and that for ethane is 0.08. Therefore, it is preferred that the fluid according to the present invention have an MIR≦0.36 and more preferably ≦0.24, still more preferably ≦0.16. In an even more preferred embodiment, the reactivity in ozone formation is preferably equal to or less than that of acetone and even more preferably equal to or less than that of ethane, by whatever scale or method is used, but most preferably by the MIR scale. Thus, in a more preferred embodiment, the fluid used in a composition according to the present invention will have an MIR less than or equal to 0.12, even more preferably less than or equal to 0.08. Most preferably the fluid selected will have MIR≦0.06.

Specifically preferred fluids according to the present invention include:

dialkyl carbonates, such as dimethyl carbonate (DMC), methyl ethyl carbonate, methyl isopropyl carbonate, methyl sec-butyl carbonate, methyl t-butyl carbonate, methyl neopentyl carbonate, and diisopropyl carbonate;

alkyl acetates, such as neopentyl acetate, ethylene glycol diacetate, 1,2-propylene glycol diacetate, 1,3-propylene glycol diacetate, 1,2-butylene glycol diacetate, 1,3-butylene glycol diacetate, 2,3-butylene glycol diacetate, neopentyl glycol diacetate;

dioxolanes such as 2,2-dimethyl dioxolane, 2,2,4-trimethyl dioxolane, 2,2,4,5-tetra methyl dioxolane;

pivalates such as methyl pivalate (methyl 1,1,1-trimethyl acetate), isopropyl pivalate, t-butyl pivalate (TBP), neopentyl pivalate (NPP), 1,2-propylene glycol bis-pivalate (PGBP), ethylene glycol bis-pivalate, ethylene glycol monopivalate, 1,2-butylene glycol monopivalate (1,2-BGMP), 2,3-butylene glycol monopivalate (2,3-BGMP), 1,2-butylene glycol pivalate acetate (1,2-BGPA), 1,2-butylene glycol pivalate acetate (1,2-BGPA), 2,3-butylene glycol pivalate acetate (2,3-BGPA), ethylene glycol pivalate acetate, 1,2 propylene glycol monopivalate, neopentyl glycol mono pivalate, and 1,2-propylene glycol pivalate acetate;

isobutyrate compounds such as methyl isobutyrate, isopropyl isobutyrate, neopentyl isobutyrate, and neopentyl glycol mono isobutyrate; and 2,2,4,4-tetramethyl pentanonitrile (TMPN); isopropyl neononanoate; pivalonitrile; methyl 2,2,4,4-tetramethyl pentanoate (methyl neononanoate) and methyl-3,5,5-trimethyl hexanoate.

In the case of a blend, the weighted average OFP of the fluids in a composition according to the present invention will preferably be similar to or less than that of acetone and more preferably similar to or less than that of ethane. When the OFP is based on the MIR scale as used herein, the blend should thus have a weight average MIR≦0.36, more preferably ≦0.24, still more preferably ≦0.16, yet still more preferably ≦0.12, and most preferably ≦0.08.

In another preferred embodiment, wherein the blend results from replacing part of a first fluid with a second fluid and thereby reducing the weight average OFP, it is preferred that the weight average OFP be reduced 10%, more preferably 25%, still more preferably 50%, from the OFP calculated prior to the fluid replacement.

In yet another preferred embodiment, the fluid or fluid blends will provide at least one other desirable performance property such as high flash point (or weighted average flash point in the case of some blends), low particulate formation, suitable evaporation rates, suitable solvency, low toxicity, high thermal stability, and inertness with respect to non-ozone producing reactions. Of course, it is more preferable that the fluid or blends have two or more of these performance attributes, and so on, so that the most preferred fluid or fluid blend has all of these performance attributes.

In the case of a process of reducing ozone formation, wherein a fluid according to the present invention replaces a fluid, at least in part, having a higher OFP, described in more detail below, it is preferred that this fluid replacement process, in addition to reducing ozone formation (or decreasing OFP of the process fluid), also results in an improvement in at least one and preferably more of the aforementioned performance attributes. In otherwords, the process results in decreased ozone formation as well at least one of (i) increased flash point or weight average flash point of the process fluid or blend; (ii) decreased particulate formation caused by the process; (iii) provide a more favorable evaporation profile of the fluid or blend; (iv) improved solvency properties; (v) decreased toxicity; (vi) increased the thermal stability; or (vii) provide a more inert fluid or fluid blend.

The flash point of a fluid according to the present invention is preferably at least −6.1° C. or higher, more preferably greater than +6.0° C., even more preferably greater than 15° C., still more preferably greater than 25° C., yet even more preferably greater than 37.8° C., and most preferably greater than 60° C. One of ordinary skill in the art can readily determine the flash point of a fluid or blend (e.g., ASTM D92-78).

In the case of a blend, the flash point of the blend may be the flash point of the more volatile component, in the instance where the flash points of the individual components differ markedly or where the more volatile component is the predominant component. Or, the flash point of the blend may be some average of the flash points of the individual components. As used herein, the term "flash point" will refer to the flash point experimentally determined for a single fluid or a blend, as applicable. In addition, we also refer herein to the "weight average flash point" of a blend; which means the calculated flash point by weight average of the individual flash points (experimentally determined) in a blend. Particularly advantageous blends according to the present invention include blends of DMC and acetone, and of DMC and methyl acetate, which provide a weight average flash point of >−6.1° C.

The fluid or blend thereof, according to the present invention, should preferably not contribute measureably to particulate formation of particulates having a size below 2.5 microns (diameter)—referred to as 2.5PM herein—in the atmosphere. In a preferred embodiment of a process of reducing ozone formation, the fluid selected to replace a previously-used solvent will be one that also reduces particulate matter to $\leq 65$ µg/m$^3$, and more preferably $\leq 50$ µg/m$^3$, when measured over a 24-hour period, preferably spatially averaged over all monitors in a given geographic area.

The evaporation rate should be suitable for the intended purpose. In many if not most applications, the fluid according to the present invention will be used to replace, at least in part, a fluid which is environmentally disadvantaged, meaning it has a reactivity in ozone formation three times (3x) greater than that of ethane and preferably greater than that of acetone, or an MIR>0.24 or more preferably >0.36. The fluid selected preferably will have a similar evaporation rate to the disadvantaged fluid being replaced, particularly in the case where a fluid blend is used and an acceptable evaporation profile is desired. It is convenient for the fluid selected to have an evaporation rate less than 14 times the evaporation rate of n-butyl acetate, and more preferably ±50 percent of the rate of n-butyl acetate. Evaporation rates may also be given relative to n-butyl acetate at 1.0 (ASTM D3539-87). Ranges of evaporation rates important for different applications are 5–3, 3–2, 2–1, 1.0–0.3, 0.3–0.1, and <0.1, relative to n-butyl acetate at 1.0. In a preferred embodiment of the present invention wherein, in a method of reducing ozone formation, a fluid according to the present invention replaces, at least in part, another fluid not according to the present invention, the fluid replaced has an evaporative rate ranging from that of MEK (methyl ethyl ketone) to that of n-butyl acetate.

The fluid or fluid blend according to the present invention may act in the traditional manner of a solvent by dissolving completely the intended solute or it may act to disperse the solute, or it may act otherwise as a fluid defined above. It is important that the solvency of the fluid be adequate for the intended purpose. In addition to the required solvency, the formulated product must be of a viscosity to enable facile application. Thus, the fluid or fluid blend must have the appropriate viscosities along with other performance attributes. One of ordinary skill in the art, in possession of the present disclosure, can determine appropriate solvent properties, including viscosity.

Toxicity relates to the adverse effect that chemicals have on living organisms. One way to measure the toxic effects of a chemical is to measure the dose-effect relationship; the dose is usually measured in mg of chemical per kg of body mass. This is typically done experimentally by administering the chemical to mice or rats at several doses in the lethal range and plotting the logarithm of the dose versus the percentage of the population killed by the chemical. The dose lethal to 50% of the test population is called the median lethal dose (LD50) and is typically used as a guide for the toxicity of a chemical. See, for instance, Kirk-Othmer Encyclopedia of Chemical Technology, Fourth Edition, Vol. 24, pp. 456–490. Currently an LD50 of >500 mg/kg qualifies as "not classified" for oral toxicity under OSHA rules. EU (European Union) uses a cutoff of >2,000 mg/kg. It is preferred that the fluid or fluid blend according to the present invention have an oral rat LD50 of >500 mg/kg, more preferably >1000 mg/kg, still more preferably >2,000 mg/kg, even more preferably >3,000 mg/kg, and most preferably >5,000 mg/kg. Likewise, the fluid or blend should also cause no toxicity problems by dermal or inhalation routes and should also not be an eye or skin irritant, as measured by OSHA or European Union (EU) standards.

The fluid according to the present invention should be thermally stable so that it does not break down. For instance, the material should not break down into reactive species such as peroxides. In a preferred embodiment, the fluid is more thermally stable than t-butyl acetate, which decomposes at about 243–337° C. (Cross, et al., *Aust. J. Chem.*, 1967, Vol. 20, 177–181).

Inertness, as used herein, refers to the lack of a tendency to undergo a reaction with other materials in the fluid, i.e., to a solute or dispersed material. It may include, for example, inertness towards acids or bases, but particularly to acid catalysts, which are typically present in coating compositions.

The present invention also concerns a process of reducing ozone formation comprising replacing at least a portion of a fluid not having a low OFP, i.e., a fluid having an OFP greater than that of acetone, preferably measure by the MIR scale, with a fluid according to the present invention, i.e., a fluid having an OFP similar to or less than acetone and more preferably similar to or less than ethane, and more preferably wherein the OFP is based on the MIR scale and having an MIR$\leq 0.36$, more preferably $\leq 24$, more preferably $\leq 0.16$, still more preferably $\leq 0.12$, and even more preferably $\leq 0.08$. Still more preferably the fluid according to the present invention has at least one of the aforementioned desirable performance attributes, yet even more preferably that the fluid have at least two, and so on, so that the most preferable fluid has all the aforementioned desirable performance attributes.

It is preferred that the fluid being replaced have an OFP greater than that of acetone. In another embodiment, the incremental reactivity, based on the MIR scale, of the fluid being replaced is preferably >0.08, more preferably >0.12, still more preferably >0.16, yet still more preferably >0.24, and most preferably >0.36.

In another embodiment, it is critical that in a process of reducing tropospheric ozone formation according to the present invention that the fluid replaced have a greater OFP than the fluid added, that is, the fluid according to the present invention. Of course it is to be recognized that only a portion of the higher OFP fluid need be replaced, thus obtaining a blend, in order to achieve the ozone formation reduction, but the greater benefit of the present invention is obtained if the fluid exchange of the higher OFP fluid for the lower OFP fluid be such that the resultant weighted average OFP of the blend, based on the MIR scale, is $\leq 0.36$, more preferably $\leq 0.24$, still more preferably $\leq 0.16$, yet still more preferably $\leq 0.12$, and even more preferably $\leq 0.08$.

However, in another embodiment of the present invention, the fluid being replaced may have an acceptable MIR but be unacceptable with respect to one or more of the aforementioned performance attributes of flash point (possibly weight average flash point in the case of some blends) or flammability, particulate formation, evaporation rate, solvency, toxicity, thermal stability, or inertness. Examples were previously given of a blend of DMC and acetone and a blend of DMC and methyl acetate, wherein the appropriate addition of DMC (or "replacement" of acetone or methyl acetate, respectively) provided for an improvement in at least one of these attributes.

Examples of fluids which are replaced by fluids according to the present invention include aromatic and aliphatic hydrocarbon fluids such as toluene, xylenes, straight chain alkanes, branched alkanes (particularly $C_6$–$C_9$ alkanes), cycloaliphatic hydrocarbons (particularly C6–$C_{10}$); alcohols such as methanol, ethanol, propanol, n-butyl alcohol, isopropyl alcohol, diacetone alcohol, and sec-butanol; esters such as ethyl acetate, propyl acetate, butyl acetate, isobutyl isobutyrate, isoamyl isobutyrate, propylene glycol methyl ether acetate (PMAC); ketones such as methyl ethyl ketone (MEK), methyl isobutyl ketone (MIBK), and C5–C10 linear ketones, cyclic ketones; halocarbons, particularly chlorinated and brominated hydrocarbons; ethers such as diethyl ether and the like, cyclic ethers such as tetrahydrofuran (THF), and methyl t-butyl ether (MTBE). Examples of other common industrial solvents which may be replaced by fluids according to the present invention are those listed in *Kirk-Othmer Encyclopedia of Chemical Technology, Fourth Edition,* Vol. 22, p. 536–548.

Some particularly preferred replacements, i.e., a fluid according to the present invention for a currently used industrial solvent, include: in any application, but particularly coatings applications, DMC or methyl pivalate for toluene, methyl ethyl ketone (MEK) or t-butyl acetate; methyl isopropyl carbonate (MIPC) for xylene, t-butyl acetate, n-butyl acetate, or methyl isobutyl ketone (MIBK); and diisopropyl carbonate (DIPC) for methyl amyl ketone (MAK), propylene glycol monomethyl ether acetate (PMAc), or ethylene glycol monobutyl ether (EB); in any application, but particularly consumer product applications DMC, MIPC, or DIPC for hydrocarbons; in any application but particularly agricultural applications, DIPC for aromatic fluids; in any application but particularly cleaning applications, DIPC or methyl sec-butyl carbonate (MSBC) for clorinated solvents; in any application, but particularly inks, substitute DMC or methyl pivalate for MEK and light acetates.

The fluids and blends according to the present invention may be used in any process using a fluid, and particularly those process wherein at least a portion of the fluid evaporates and even more particularly wherein at least a portion evaporates into the atmosphere. Preferred processes are those utilizing the fluid as one or more of a carrier, diluent, dispersant, solvent, and the like, include processes wherein the fluid functions as an inert reaction medium in which other compounds react; as a heat-transfer fluid removing heat of reaction; to improve workability of a manufacturing process; as a viscosity reducer to thin coatings to application viscosity; as an extraction fluid to separate one material from another by selective dissolution; as a tackifier or to improve adhesion to a substrate for better bonding; as a dissolving medium to prepare solutions of polymers, resins, and other substances; to suspend or disperse pigments and other particulates; and the like.

It is preferred that the process be a stationary process and also preferred that the process be a non-combustion process. It is particularly beneficial if the fluid according to the present invention be used to replace at least a portion of a traditional industrial solvent in a process using a large amount of fluid, e.g., a process using 800 lb/year, more preferably 1,000 lbs/year, even more preferably 5 tons/year, still more preferably 50 tons/year, and most preferably one million lbs/year. In a preferred embodiment, the process wherein the aforementioned fluid replacement occurs is on the scale of at least pilot plant-scale or greater.

It is also preferred that the process in which a fluid or blend according to the present invention is used or in which at least one fluid according to the present invention replaces, at least partially, a fluid having a higher OFP, be a process in which the fluid is intended to evaporate, such as in a coating process. In such a process were the fluid is intended to evaporate, it is preferred that at least 10% of the fluid or fluids evaporate, more preferably 20% of the fluids, and so on, so that it is most preferable if >99% of the fluid or fluids present in the coating evaporate.

Furthermore, one of the greatest environmental benefits of replacing a currently-used industrial solvent with a solvent according to the present invention will be realized if performed in a geographic area where monitoring for ozone and particulate matter formation occurs, and more particularly in geographic areas defined by a city and its contiguous area populated by at least 500,000 persons, and wherein the replacement of at least a portion of the currently-used industrial solvent with a fluid according to the present invention causes at least one of:

(i) a reduction in the ozone formation, as measured by either monitoring devices or by a calculation of the reduction using the OFP of the industrial solvent replaced and the fluid added according to the present formation, preferably using the MIR scale, and in a preferred embodiment wherein the reduction in OFP is from above that of acetone to below that of acetone, more preferably above that of acetone to below that of ethane; or (ii) a reduction in particulate formation of particles having a diameter less than 2.5 microns (2.5PM), preferably measured as a 24 hour standard, more preferably wherein that reduction is from greater than 65 $\mu g/m^3$ to less than that amount in a 24 hour period, still more preferably from greater than 65 $\mu g/m^3$ to less than or equal to 50 $\mu g/m^3$ in a 24 hour period;

and more preferably both (i) and (ii).

In another embodiment, there is a method of selecting a fluid for use in a process wherein at least a portion of the fluid eventually evaporates into the atmosphere, comprising selecting as the fluid a blend of:

(a) at least one fluid A having a low OFP, preferably similar to or less than that of acetone and more preferably similar to or less than that of ethane, and even more preferably where such reactivity is based on the MIR scale, still more preferably wherein the MIR is less than or equal to 0.36, more preferably less than or equal to 0.24, yet still more preferably wherein the MIR is less than or equal to 0.16, even yet still more preferably wherein the MIR is less than or equal to 0.12 and still even more preferably less than or equal to 0.08; and (b) at least one fluid B characterized by having at least one unsuitable attribute selected from: (i) high OFP, preferably measured relative to acetone by any method but more preferably by the MIR scale, e.g., having an MIR>0.12, more preferably >0.16, even more preferably >0.24, and yet even more preferably >0.36; (ii) high flash point or weight average flash point, preferably less than or equal to 60° C., more preferably less than or equal to 37.8° C., still more preferably less than or equal to 25° C., even more preferably less than or equal to 15° C., yet even more preferably less than or equal to 6.0° C., and most preferably less than −6.1° C.; (iii) formation of 2.5 PM particulates (e.g. wherein said process, using fluid B, produces 2.5 PM greater than 65 micrograms per cubic meter or greater, as measured in a 24-hour period); (iv) evaporation rate, particularly those having an evaporative rate >±50 percent with respect to n-butyl acetate; (v) toxicity, preferably those having an oral rat LD50 less than or equal to 5,000 mg/kg, more preferably less than or equal to 3,000 mg/kg, still more preferably less than or equal to 2,000 mg/kg, even more preferably less than or equal to 1,000 mg/kg, and most preferably less than or equal to 500 mg/kg; (vi) thermal stability, preferably having a thermal stability equal to or less than (more unstable) than t-butyl acetate; and (vii) inertness in the fluid or fluid blend, particularly with respect to any acids or bases present in the fluid or blend.

Preferred examples of fluid A include:

dialkyl carbonates, such as dimethyl carbonate (DMC), methyl ethyl carbonate, methyl isopropyl carbonate, methyl sec-butyl carbonate, methyl t-butyl carbonate, methyl neopentyl carbonate, and diisopropyl carbonate;

alkyl acetates, such as neopentyl acetate, ethylene glycol diacetate, 1,2-propylene glycol diacetate, 1,3-propylene glycol diacetate, 1,2-butylene glycol diacetate, 1,3-butylene glycol diacetate, 2,3-butylene glycol diacetate, neopentyl glycol diacetate;

dioxolanes such as 2,2-dimethyl dioxolane, 2,2,4-trimethyl dioxolane, 2,2,4,5-tetra methyl dioxolane;

pivalates (trimethyl acetates) such as methyl pivalate, isopropyl pivalate, t-butyl pivalate (TBP), neopentyl pivalate (NPP), 1,2-propylene glycol bis-pivalate (PGBP), ethylene glycol bis-pivalate, ethylene glycol monopivalate, 1,2-butylene glycol mono-pivalate (1,2-BGMP), 2,3-butylene glycol monopivalate (2,3-BGMP), 1,2-butylene glycol pivalate acetate (1,2-BGPA), 1,2-butylene glycol pivalate acetate (1,2-BGPA), 2,3-butylene glycol pivalate acetate (2,3-BGPA), ethylene glycol pivalate acetate, 1,2 propylene glycol monopivalate, neopentyl glycol mono pivalate, and 1,2-propylene glycol pivalate acetate;

isobutyrate compounds such as methyl isobutyrate, isopropyl isobutyrate, neopentyl isobutyrate, and neopentyl glycol mono isobutyrate; and 2,2,4,4-tetramethyl pentanonitrile (TMPN); isopropyl neononanoate; pivalonitrile; methyl 2,2,4,4-tetramethyl pentanoate (methyl neononanoate); and methyl-3,5,5-trimethyl hexanoate.

Preferred examples of fluid B include aromatic and aliphatic hydrocarbon fluids such as toluene and xylenes; alcohols such as methanol, isopropyl alcohol, n-butyl alcohol, n-propyl alcohol, diacetone alcohol, and sec-butanol; esters such as ethyl acetate, propyl acetate, methyl isobutyrate, butyl acetate, isobutyl isobutyrate, isoamyl isobutyrate, propylene glycol methyl ether acetate; ketones such as methyl ethyl ketone (MEK), $C_5$–$C_{10}$ linear ketones, cyclic ketones; halocarbons, particularly chlorinated and brominated hydrocarbons; cyclic ethers such as THF, and non-cyclic ethers such as methyl tert-butyl ether (MTBE).

The present invention also concerns mixtures or blends of at least one fluid according to the present invention and fluids which are known to have acceptable low OFP, e.g., acetone (MIR=0.12), methyl acetate (MIR=0.03), tert-butyl acetate (MIR=0.04), tertiary butanol (MIR=0.10), dimethyl succinate (MIR=0.05), dimethyl glutarate (MIR=0.10), and propylene carbonate (MIR=0.11). Such blends can have some important advantages, for example, blends of DMC and acetone, or DMC and methyl acetate, as previously mentioned. These blends are also considered to be part of the present invention. In combination with fluids having an MIR higher than 0.12, the fluids still can provide significant reduction in ozone formation for blended fluid compositions with other important properties for the particular application. Therefore, fluid compositions with low or reduced OFP comprising solvents selected from the list above are important goals of the present invention, even if their weighted OFP is above 0.12 in the MIR scale.

The fluids listed above are recommended to be used in solvent compositions intended for release into air and are required to provide low reactivity in ozone formation. The solvents selected according to the present invention can be used in blends with each other as well as in blends with other solvents (e.g., solvents B, above), different from the solvents of present invention. When all solvents included in the blend have MIR reactivity ~0.12 or less, the solvent blends also will have low atmospheric photochemical reactivity with MIR of about 0.12 and less.

The present inventors have found that many solvent blends can have an OFP in the range of ethane or acetone, even thought one component may exceed that range, and therefore in terms of reactivity toward ozone formation behave as exempt solvents. The range of reactivities in exempt solvents allows a selection of fluids with extremely low reactivity, with MIR number in range of ≦0.08 and more suitably ≦0.06. These fluids can be blended not only with fluids with reactivity based on MIR of ~0.12 or less but, with appropriately selected fluids with MIR numbers >0.12 and at certain ratios still form fluid compositions with weighted reactivity about 0.12 or less. These blends can significantly expand the range of properties of solvent compositions and provide formulators with necessary flexibility for different applications. The selection of fluids with MIRs >0.12 can be relatively wide, however, to achieve significant reduction in weighted reactivity to ~0.12 or less, it is recommended to choose solvent with MIR <0.4, suitably <0.3, and more suitably <0.25.

The conception of blends demonstrating MIR of about 0.12 or less can be applied to other solvents with known extremely low reactivities. For example, methyl acetate has MIR 0.03 but flash point ~−12° C. Thus, methyl acetate can be blended with butyl acetate (MIR=0.24 and flash point 27° C.) in weight ratio of 57:43 forming a blend with MIR=0.12, providing reactivity similar to exempt solvents. This blend would have better weight average flash point and lower evaporation rate, making it useful for many applications which methyl acetate could not satisfy due to very low flash point. Butyl acetate which is not an exempt solvent, would become part of a mixture which by its weighted reactivity would behave similar to exempt solvent and, therefore, constitute preferred solvent composition.

This special case of blends comprising at least one solvent with MIR reactivity <0.12 and at least one solvent with MIR >0.12 which have their weighted reactivity about 0.12 or less is one very important part of the present invention. Among known solvents with extremely low MIR, suitable components for the preferred blended solvents are methyl acetate (MIR=0.03), t-butyl acetate (MIR=0.04), dimethyl succinate (MIR=0.05) and methyl siloxanes including cyclomethylsiloxanes. Blends of these solvents with other solvents with MIR >0.12 resulting in weighted MIR of about 0.12 or less for the blend are preferred solvents according to the present invention.

However, some of most interesting blends are the blends of at least one solvent with MIR reactivity <0.12, with at least one with MIR reactivity >0.12, which can be generated with the solvents from the list of the present invention.

The present invention offers fluids and fluid blends for use in a variety of industrial applications such as paints and other coatings, adhesives, sealants, agricultural chemicals, cleaning solution, consumer products such as cosmetics, pharmaceuticals, drilling muds, extraction, reaction diluents, inks, metalworking fluids, etc.

Among the most preferred fluids according to the present invention are dimethyl carbonate and methyl pivalate. Methyl pivalate (MP) demonstrates outstanding thermal and chemical resistance in acid and alkaline media, while its isomer t-butyl acetate, which has recently been proposed by EPA to become an exempt VOC, has limited thermal stability and is sensitive to acids, which is a problem for many acid catalyzed compositions, as used in a majority of coating formulations. Heretofore unrecognized as a low OFP fluid, the present inventors have determined that MP has an MIR, calculated using the SAPRC97 model discussed in the introduction, of 0.06.

Likewise, dimethyl carbonate (DMC) is highly preferable and can be blended with another organic solvent, even one having an MIR greater than 0.12 to form a solvent system that would still have a MIR of less than 0.12. DMC blended with another organic solvent would also exhibit other desirable environmental properties because DMC has a relatively high flash point and low toxicity. Again, heretofore unrecognized as a low OFP fluid, the MIR of DMC is calculated to be 0.02, using the SAPRC97 model.

The most preferred use of the fluids according to the present invention is with any process wherein the reduction of ozone formation is desired, and more particularly in consumer products, and coatings such as auto refinishing, architectural and industrial coatings, and even more preferably in protective coatings, such as paints.

Paints and coatings comprise the largest single category of traditional solvent consumption, accounting for nearly half the solvents used. Fluids serve multiple functions in paints and coatings, including solubility, wetting, viscosity reduction, adhesion promotion, and gloss enhancement. Fluids dissolve the resins, dyes and pigments used in the coating formulations. Also, prior to application, it is common practice to add solvent thinner to attain the desired viscosity for the particular application. Solvents begin to evaporate as soon as the coating materials are applied. As the solvent evaporates, film formation occurs and a continuous, compact film develops. Single solvents are sometimes used in coatings formulations, but most formulations are blends of several solvents. In many coatings applications, the solvent system includes a slow-evaporating active solvent that remains in the film for an extended period to enhance the film's gloss and smoothness. Because of evaporation and the large amounts of solvents used in coatings, there is a significant amount of VOC emissions into the atmosphere.

Resins which may be incorporated into compositions comprising fluids according to the present invention include acrylic, alkyd, polyester, epoxy, silicone, cellulosic and derivatives thereof (e.g., nitrocellulosic and cellulosic esters), PVC, and isocyanate-based resins. Numerous pigments and dyes may also be incorporated into compositions according to the present invention, and it is within the skill of the ordinary artisan to determine proper selection of the resin and pigment and/or dye, depending on the end use of the coating.

One of the cleaning applications is cold solvent cleaning which is used to degrease metal parts and other objects in many operations. Mineral spirits have been popular in cold cleaning, but are being supplanted by higher flash point hydrocarbon solvents due to emissions and flammability concerns. Efforts to eliminate organic solvents entirely from cleaning compositions have not been successful because aqueous cleaners do not have the performance properties that make organic solvent based cleaners so desirable. This invention allows formulators the option to seek the use of solvents with very low reactivity as environmentally preferred products meeting environmental concerns and customer performance concerns.

A cleaning solution application which uses evaporation to clean is called vapor degreasing. In vapor degreasing, the solvents vaporize and the cold part is suspended in the vapor stream. The solvent condenses on the part, and the liquid dissolves and flushes dirt, grease, and other contaminants off the surface. The part remains in the vapor until it is heated to the vapor temperature. Drying is almost immediate when the part is removed and solvent residues are not a problem. The most common solvent used in vapor degreasing operations has been 1,1,1-trichloroethane. However, since 1,1,1-trichloroethane is being phased out due to ozone depletion in the stratosphere, alternatives are needed. Moreover, chlorine-based solvents have toxicity concerns. Thus, some of the low reactivity, high flash point solvents in this invention can be used in place of 1,1,1-trichloroethane and other halogenated solvents.

An application that is similar to coatings is printing inks. In printing inks, the resin is dissolved in the solvent to produce the ink. Most printing operations use fast evaporating solvents for best production speeds, but the currently used solvents are highly reactive. Some of the previously described fast evaporation, high flash point, low reactivity in ozone formation fluids according to the present invention are suitable for printing inks.

An application that is suitable to the low toxicity, high flash point and low reactivity in ozone formation fluids according to the present invention is agricultural products. Pesticides are frequently applied as emulsifiable concentrates. The active insecticide or herbicide is dissolved in a hydrocarbon solvent which also contains an emulsifier. Hydrocarbon solvent selection is critical for this application. It can seriously impact the efficiency of the formulation. The solvent should have adequate solvency for the pesticide, promote good dispersion when diluted with water, have low toxicity and a flash point high enough to minimize flammability hazards.

Extraction processes, used for separating one substance from another, are commonly employed in the pharmaceutical and food processing industries. Oilseed extraction is a widely used extraction process. Extraction-grade hexane is a common solvent used to extract oil from soybeans, cottonseed, corn, peanuts, and other oil seeds to produce edible oils and meal used for animal feed supplements. Low toxicity, high flash point, low MIR fluids and fluid blends of the present invention can be useful in such industries.

In addition to the above-mentioned applications, other applications that can use high flash point, low toxicity, low reactivity in ozone formation fluids are adhesives, sealants, cosmetics, drilling muds, reaction diluents, metal working fluids, and consumer products, such as pharmaceuticals or cosmetics.

The invention is further described in the following examples, which are intended to be illustrative and not limiting. One of skill in the art will recognize that numerous variations are possible within the scope of the appendaged claims.

EXAMPLE 1

A representative solvent/resin system was chosen to evaluate the sensitivity of a system to solvent changes and evaporation rate differences. Sequential changes to the solvent system were made, and the impact on resin solubility and evaporation rate profile was determined.

The initial system consisted of 30 wt % Acryloid B-66 resin (an acrylic resin available from Rohm & Haas) in a fluid mixture comprised of 40 wt % MEK (methyl ethyl ketone), 40 wt % MIBK (methyl isobutyl ketone), and 20 wt % Exxate® 600 (a $C_6$ alkyl acetate available from Exxon Chemical Company). DMC was substituted in increments for MIBK, while keeping the rest of the system constant. For example, a solvent blend of 40 wt % MEK, 35 wt % MIBK, 5 wt % DMC and 20 wt % Exxate® 600 was evaluated, and so on until the final solvent blend consisted of 40 wt % MEK, 0 wt % MIBK, 40 wt % DMC and 20 wt % Exxate® 600. This same procedure was repeated substituting DMC for MEK, methyl pivalate for MIBK, and methyl pivalate for MEK, while keeping the rest of the solvent system the same. Ultimately, a solvent blend in which both the MEK and MIBK were replaced by DMC (i.e., 80 wt % DMC and 20 wt % Exxatee® 600) and in which both MEK and MIBK were replaced by methyl pivalate (i.e., 80 wt % methyl pivalate and 20 wt % Exxate® 600) was considered. Evaporation profiles were compared for each solvent blend.

The time required to evaporate 10, 50, and 90 wt % of the fluid was calculated for the series of solvent blends using CO-ACT$^{SM}$ computer program, which is Exxon Chemical Company's proprietary computer program for estimating solubility parameters for solvents and resins and modeling evaporative profiles of solvent-resin formulations (see, for instance, Dante et al., *Modem Paint and Coatings*, September, 1989). The results are shown below in Table 1.

TABLE 1

| | Evaporation (minutes) | | | MIR |
|---|---|---|---|---|
| Wt % in fluid (w/20 wt % Exxate ® 600) | 10% | 50% | 90% | Reduction |
| 40 MEK/40 MIBK | 0.7 | 4.9 | 46 | (comparative) |
| 40 MEK/0 MIBK/40 DMC | 0.5 | 3.8 | 48 | 70% |
| 0 MEK/40 MIBK/40 DMC | 1.0 | 6.9 | 50 | 19% |
| 0 MEK/0 MIBK/80 DMC | 0.8 | 5.4 | 55 | 89% |
| 40 MEK/0 MIBK/40 MP | 0.5 | 3.5 | 44 | 68% |
| 0 MEK\40 MIBK/40 MP | 0.9 | 6.3 | 48 | 17% |

The reduction in MIR is calculated using the known values of 0.34 for MEK, 1.19 for MIBK, and the values we have had determined of 0.02 for DMC and 0.06 for methyl pivalate (MP).

These results show that there is very little difference in the evaporation profiles between a known resin/solvent system and a resin/solvent system using the fluids according to the present invention. Moreover, the above results show the advantage of the process according to the present invention of reducing ozone formation by replacing at least a portion of a fluid not having a low ozone formation potential (MIR≦0.1 2) with a solvent exhibiting a low reactivity in ozone formation.

Comparative Example 1

The above experiment was repeated using fluids known to have low reactivity in ozone formation, methyl acetate (MeOAc, MIR=0.03) and t-butyl acetate (t-BuOAc, MIR=0.05). The results are shown below.

TABLE 2

| | Evaporation (minutes) | | | MIR |
|---|---|---|---|---|
| Wt % in fluid (w/20 wt % Exxate ® 600) | 10% | 50% | 90% | Reduction |
| 40 MEK/40 MIBK | 0.7 | 4.9 | 46 | (comparative) |
| 40 MEk/0 MIBK/40 MeOAc | 0.2 | 1.6 | 44 | 69% |
| 0 MEK/40 MIBK/40 MeOAc | 0.2 | 2.9 | 47 | 19% |
| 40 MEK/0 MIBk/40 t-BuOAc | 0.5 | 3.5 | 44 | 68% |
| 0 MEk/40 MIBK/40 t-BuOAc | 0.9 | 6.2 | 48 | 17% |

The results do show a marked effect in the evaporation profile when MeOAc is substituted for MEK or MIBK, and thus this known low OFP fluid would not be a good substitute for currently-used coating fluids. While t-BuOAc shows a similar profile to DMC and MP, as discussed above t-BuOAc is thermally unstable, and is not inert with respect to acids, as shown below.

EXAMPLE 2

Acrylic solvent systems were prepared to test the stability of methyl pivalate (MP) to acid catalysts, which are commonly present in coating compositions. The formulations contained 28 wt % methyl pivalate from Exxon Chemical Company, 28.8 wt % pentyl acetate, 20 wt % n-butyl acetate, 16 wt % n-butyl alcohol, 5.2 wt % isopropyl alcohol, and 2 wt % toluene as an internal standard. The latter materials were purchased from Aldrich Chemical Co.

Para toluene sulfonic acid (pTSA), blocked (complexed) and unblocked (PTSA* and pTSA, respectively, in Table 3 below) was added to the above formulation (again, pTSA was purchased from Aldrich Chemical Co.), in the amount of 0.5 wt %. The solutions were sealed and placed in a vacuum oven at 50° C. under a nitrogen atmosphere, and samples were withdrawn at intervals for testing. The decomposition of methyl pivalate to pivalic acid and methanol was monitored over time by analysing for total acid number (TAN) using a Mettler DL212 titrator and gas chromatographic analysis using an HP 5890 gas chromatograph. The results are shown below in Table 3 (all percentages are by weight).

Comparative Example 2

Formulations identical to those in Example 2, above, were prepared, except using tert-butyl acetate (TBA) instead of methyl pivalate. The decomposition of methyl pivalate to acetic acid and isobutylene was monitored over time by analysing for TAN as in Example 2. The results are shown below in Table 3.

TABLE 3

| Formulation | time | % acetic acid | % pivalic acid |
|---|---|---|---|
| TBA, 0.5% pTSA | 1 wk/2 wk | 1.2/2.0 | |
| MP, 0.5% pTSA | 1 wk/2 wk | | ND/ND |
| TBA, 0.5% pTSA* | 1 wk/2 wk | 0.32/0.37 | |
| MP, 0.5% pTSA* | 1 wk/2 wk | | ND/ND |

ND = not detectable; pTSA* contains methanol, propanol and pyridine

The above results clearly show that methyl pivalate is more stable to acid catalysts than is t-butyl acetate. Thus, a coating formulation containing methyl pivalate as a fluid would be expected to be more storage stable than one containing t-butyl acetate. Storage stability is an important attribute in a coating composition, e.g., a paint.

EXAMPLE 3

A cold-cleaning solvent comprising about 10–60 wt % fluorocarbon, about 1–30 wt % of a chlorinated solvent, and about 10–40 wt % of an oxygenated organic solvent is disclosed in U.S. Pat. No. 5,552,080. The oxygenated organic solvent is preferably n-butanol or isopropanol, but may be also selected from numerous other oxygenated organic fluids, including DMC.

The present inventors have surprisingly discovered that fluids according to the present invention may be used in the aforementioned cleaning composition to reduce tropospheric ozone formation, which is the opposite phenomenon from ozone depletion. This is completely unexpected.

Moreover, contrary to the disclosure by the inventors of the above-mentioned patent, DMC is superior to any of the solvents listed, in terms of reduced ozone formation. That is, replacing n-butanol (MIR=0.90) entirely with DMC (MIR=0.02) results in a huge decrease in the overall weighted average of the blend. Likewise, the present invention also contemplate a blend of, for instance, 50/50 n-butanoVDMC or 50/50 n-butanol/MP, along with the halocarbons, as a cold cleaning solvent useful in reducing ground-based ozone formation. This is a second unexpected result provided by the present invention. Similar results can be expected using methyl pivalate and the other fluids according to the present invention, without a loss of cleaning efficacy.

EXAMPLE 4

Extraction-grade hexane, having a known MIR=0.43, is blended with DMC (MIR=0.02) in a 24 wt %/76 wt % hexane/DMC mixture having a weight average MIR equal to that of acetone (MIR=0.12). The blend is used in an oilseed extraction process, greatly decrease ozone formation without significant loss of extraction efficiency.

EXAMPLE 5

The delivery of seed coatings including insecticides and other pesticides, and agents attenuating the growth of plants (e.g., hormones) is extremely valuable to the agricultural industry. In addition to traditional coating techniques, the OSIT method (Organic Solvent Infusion Technique) has been studied and may be useful in the germination of hard coated seeds. In this method, the seed is soaked in the solvent for a fixed amount of time. The solvents are generally highly volatile solvents such as xylene, acetone, methylene chloride ($MeCl_2$). This technique has also been studied in the context of translocation experiments for the production of transgenic crops.

The substitution of DMC and MP for MEK results in a similar evaporation profile, while greatly reducing the MIR of the fluid used, in the case of xylene (p-xylene has the lowest MIR of the xylenes, at MIR=1.12) and acetone (MIR=0.12), and having a reduced toxicity in the case of $MeCl_2$ (MIR unknown).

The invention has now been described in detail, and it is to be understood that the ordinary artisan in possession of the present disclosure could practice the invention, within the spirit and scope of the appended claims, other than as specifically set forth. Hence, it will be appreciated that many variations of the following preferred embodiments can be practiced:

- a first preferred embodiment, which is a composition, optionally suitable for a coatings application, comprising at least one fluid, preferably an organic fluid, more preferably a liquid organic fluid, still more preferably a liquid organic fluid which is an oxygenated hydrocarbon, said fluid having a low OFP, preferably similar to or lower than that of acetone and more preferably less than that of ethane, wherein the low reactivity is preferably measured by the MIR scale;
- even more preferably also having at least one or more of the following attributes: satisfying at least one of the flash point criterion set forth herein or otherwise having a low flammability, low formation of particulates having a diameter of 2.5 microns or less, as described in more detail above, suitable evaporation rates and solvency that will be useful in a wide range of industrial applications, such as by dispersing, solvating, acting as a carrier, diluent, and the like, low toxicity such that LD50 satisfies the criteria as otherwise described herein, high thermal stability, and inertness to reaction in solution, particularly to acid or base catalyzed reactions;
- and still more preferably wherein the composition comprises, includes, consists or consists essentially of a fluid selected from:
- dialkyl carbonates, such as dimethyl carbonate (DMC), methyl ethyl carbonate, methyl isopropyl carbonate, methyl sec-butyl carbonate, methyl t-butyl carbonate, methyl neopentyl carbonate, and diisopropyl carbonate;
- alkyl acetates, such as neopentyl acetate, ethylene glycol diacetate, 1,2-propylene glycol diacetate, 1,3-propylene glycol diacetate, 1,2-butylene glycol diacetate, 1,3-butylene glycol diacetate, 2,3-butylene glycol diacetate, neopentyl glycol diacetate;
- dioxolanes such as 2,2-dimethyl dioxolane, 2,2,4-trimethyl dioxolane, 2,2,4,5-tetra methyl dioxolane;
- pivalates such as methyl pivalate, isopropyl pivalate, t-butyl pivalate (TBP), neopentyl pivalate (NPP), 1,2-propylene glycol bis-pivalate (PGBP), ethylene glycol bis-pivalate, ethylene glycol monopivalate, 1,2-butylene glycol mono-pivalate (1,2-BGMP), 2,3-butylene glycol monopivalate (2,3-BGMP), 1,2-butylene glycol pivalate acetate (1,2-BGPA), 1,2-butylene glycol pivalate acetate (1,2-BG PA), 2,3-butylene glycol pivalate acetate (2,3-BGPA), ethylene glycol pivalate acetate, 1,2 propylene glycol monopivalate, neopentyl glycol mono pivalate, and 1,2-propylene glycol pivalate acetate;
- isobutyrate compounds such as methyl isobutyrate, isopropyl isobutyrate, neopentyl isobutyrate, and neopentyl glycol mono isobutyrate; and
- 2,2,4,4-tetramethyl pentanonitrile (TMPN); isopropyl neononanoate; pivalonitrile; methyl 2,2,4,4-tetramethyl pentanoate (methyl neononanoate); and methyl-3,5,5-trimethyl hexanoate;
- preferably wherein the composition is used in a stationary, non-combustion process, on an industrial scale, said composition also including a second fluid, wherein the second fluid has a high OFP, preferably an OFP greater than than of acetone, and more preferably an OFP as measure on the MIR scale of >0.24; and even more preferably wherein the composition further includes at least one resin and yet still more preferably wherein the composition further comprises a pigment or dye;
- and also a composition suitable for coating a substrate, comprising one of the aforementioned fluids having a low OFP in the first embodiment above, preferably dimethyl carbonate, methyl pivalate, t-butyl pivalate, or a mixture thereof, and at least one solute, wherein said solute is preferably selected from the group consisting of resins, pigments, dyes, and mixtures thereof; and optionally also wherein the composition does not contain a halocarbon, more preferably wherein the composition contains less than 1000 ppm of any chlorocarbon or bromocarbon; and also optionally wherein the composition is not used in a combustion process, and also optionally wherein the fluid has at least one of the following attributes:
  - i) an MIR equal to or less than that of acetone or more preferably equal to or less than that of ethane;
  - ii) a flash point of at least −6.1° C., or the even more preferable flash points set forth herein above, wherein the flash point may be a weight average flash point in the case of a blend;

iii) a toxicity level wherein oral rat LD50 is at least 500 mg/kg, or the even more preferable toxicity levels set forth above;

iv) a low formation of particulates less than 2.5 microns, where "low formation" is defined as less than 65 micrograms per cubic meter measured over a 24 hour period or more preferably less than 50 micrograms per cubic meter, measure over the same period;

v) an evaporative rate of 0.1 to 14 relative to normal butyl acetate or more preferably ±50 percent of that of n-butyl acetate;

and even more particularly wherein DMC or methyl pivalate or the mixture thereof is present in an amount sufficient to bring the weight average MIR of a composition to below 0.36 and more preferably below 0.24, and still more preferably below 0.16, yet still more preferably below 0.12, still even more preferably below 0.08, and most preferably below 0.06, and in another embodiment wherein the amount of DMC or methyl pivalate is at least 10 percent by volume, more preferably in the amount of more than 25 percent by volume, still more preferably in the amount of at least 50 percent by volume of the organic liquid in the composition, and most preferably wherein the fluid is a paint mixture containing a dye, pigment, or mixture thereof.

Or, more particularly, this preferred embodiment relates to a non-combustion process utilizing a process fluid comprising a first fluid wherein at least some of said first fluid evaporates into the atmosphere, the improvement comprising replacing at least a portion said first fluid with a second fluid selected from dimethyl carbonate, methyl pivalate, or a mixture thereof, thereby decreasing ozone formation from atmospheric photochemical reactions; and also more preferable embodiments including: where said process fluid acts as a solvent, carrier, diluent, surface tension modifier, or any combination thereof, in said process; where said process fluid does not contain a halocarbon; where said decreasing ozone formation is based on a calculation using an OFP scale; where said decreasing ozone formation is based on a calculation using the relative MIR scale, using an ROG= 3.93; where said process is a stationary industrial process; where said replacing results in at least one of the following improvements:

i) an OFP at least 10% less than the OFP of the process fluid prior to said replacing;

ii) the flash point or a weighted average flash point of the process fluid increasing to above −6.1° C.;

iii) an increase in toxicity level of the process fluid to at least 2000 mg/kg;

iv) a measureable decrease in the formation of particulates having a diameter less than 2.5 microns produced by said process;

v) a change in the evaporative rate of the process fluid into the range of 0.1 to 12 relative to normal butyl acetate;

vi) a decrease in the decomposition of the process fluid based on reactions with acid catalysts present in said fluid; or where at least two and more preferably three, or even more preferably four, or still more preferably five and most preferably six of these properties are improved; where said replacing results in a blend of fluids, and wherein said blend has a flash point or a weight average flash point of at least greater than 15° C.; or where said blend has a flash point or a weight average flash point of at least greater than 60° C.; or where said replacing results in a reduction in the OFP of the process fluid by at least 10%; or where said reduction is at least 25%; or where said reduction is at least 50%; or where said process is a coating process comprising coating a substrate with a composition comprising at least one fluid which is intended to evaporate; and where said process provides a painted surface; where said first fluid is selected from at least one of toluene, xylenes, methanol, ethanol, n-butanol, n-pentanol, isopropyl alcohol, diacetone alcohol, sec-butanol, ethyl acetate, propyl acetate, butyl acetate, isobutyl isobutyrate, isoamyl isobutyrate, propylene glycol methyl ether acetate, methyl ethyl ketone, methyl isobutyl ketone, $C_5$–$C_{10}$ linear ketones, cyclic ketones, halocarbons, methyl t-butyl ether; mineral spirits; and especially where the second fluid is DMC, MP, or a mixture thereof; and finally where said first fluid replaced has an evaporative rate ranging from that of MEK to that of n-butyl acetate, and after said replacing the process fluid has an evaporative rate ranging from that of MEK to that of n-butyl acetate.

A second preferred embodiment is a method of selecting a fluid system used in an industrial process or for a composition manufactured by an industrial process, comprising selecting at least one fluid having a low OFP as set forth above in the first preferred embodiment, either specifically, e.g., as in DMC, or generally, e.g., with reference to ozone formation, MIR, and the like, preferably having an MIR $\leq 0.24$, preferably $\leq 0.16$, more preferably $\leq 0.12$, still more preferably $\leq 0.08$, and most preferably $\leq 0.06$;

and also a second fluid, not having a low OFP, preferably having an MIR >0.24, or in an embodiment selected from hydrocarbon fluids such as toluene and xylenes; alcohols such as methanol, isopropyl alcohol, diacetone alcohol, and sec-butanol;esters such as ethyl acetate, propyl acetate, methyl isobutyrate, butyl acetate, isobutyl isobutyrate, isoamyl isobutyrate, propylene glycol methyl ether acetate; ketones such as methyl ethyl ketone (MEK), linear ketones, preferably $C_5$–$C_{10}$ linear ketone, cyclic ketones; halocarbons, particularly chlorinated hydrocarbons; and methyl t-butyl ether (MTBE);

and wherein the selection is made so that the weight average OFP, based on any OFP scale but preferably based on the MIR scale, is equal to or less than that of acetone and even more preferably equal to or less than that of ethane, and when measured by the MIR scale is less than or equal to the preferred MIR of the blends set forth above (e.g., weight average MIR $\leq 0.24$, etc), and even more preferably wherein the blend has at least one of the aforementioned performance attributes, and/or especially wherein at least one of the following criterion renders the blend superior, in that criterion, to such a composition without a fluid according to the present invention: e.g.; blend flash point or weighted average flash point, solvency, formation of 2.5PM, evaporation rate, toxicity, thermal stability, and inertness.

Finally, but not in the least, there is the third preferred embodiment of an improved industrial process which uses a fluid, the improvement comprising decreasing the contribution of said process to ground-based ozone formation by substituting for at least a portion of the fluid used a fluid according to the present invention, and preferably selected from any one or more of the low OFP fluids set forth in the first embodiment above, and even more preferred wherein the final fluid used in the process is a blend as set forth in the second preferred embodiment, and particularly wherein the process is one set forth herein and even more preferably wherein the process is a coating process, an extraction process, a drilling process, or the process is one used to produce a consumer product, such as a pharmaceutical or cosmetic, and preferably wherein the decrease in contribution of said process to ground-based ozone formation is such that the MIR of the process fluid, whether it be a single fluid or blend, decreases from >0.24 to less than or equal to 0.24, more preferably from >0.24 to less than or equal to 0.16, even more preferably from >0.24 to less than or equal to 0.12, and so on as set forth above. In this embodiment, it is preferred that at least one of the previously recited performance properties be absent in the initial fluid and present in the final fluid.

We claim:

1. A process for producing a low ozone forming process fluid consisting essentially of a first fluid selected from the group consisting of: toluene, xylenes, methanol, ethanol, n-butanol, n-pentanol, isopropyl alcohol, diacetone alcohol, sec-butanol, ethyl acetate, propyl acetate, butyl acetate, isobutyl isobutyrate, isoamyl isobutyrate, propylene glycol methyl ether acetate, methyl ethyl ketone, methyl isobutyl ketone, $C_5$–$C_{10}$ linear ketones, cyclic ketones, methyl t-butyl ether and mineral spirits, wherein the improvement comprises adding a second fluid selected from dimethyl carbonate, methyl pivalate, or a mixture thereof to said first fluid, thereby forming a process fluid which exhibits an ozone forming potential (OFP) which is at least 10% less than the OFP of said first fluid.

2. The process according to claim 1, wherein said process fluid acts as a solvent, carrier, diluent, surface tension modifier, or any combination thereof, in said process.

3. The process according to claim 1, wherein said process fluid does not contain a halocarbon.

4. The process according to claim 1, wherein said decreasing ozone formation is based on a calculation using an OFP scale.

5. The process according to claim 1, wherein said decreasing ozone formation is based on a calculation using the relative MIR scale, using an ROG=3.93.

6. The process according to claim 1, wherein said process is a stationary industrial process.

7. The process according to claim 1, wherein said replacing results in at least one of the following improvements:
   i) an OFP at least 10% less than the OFP of the process fluid prior to said replacing;
   ii) the flash point or a weighted average flash point of the process fluid increasing to above −6.1° C.;
   iii) an increase in toxicity level of the process fluid to at least 2000 mg/kg;
   iv) a measureable decrease in the formation of particulates having a diameter less than 2.5 microns produced by said process;
   v) a change in the evaporative rate of the process fluid into the range of 0.1 to 12 relative to normal butyl acetate;
   vi) a decrease in the decomposition of the process fluid based on reactions with acid catalysts present in said fluid.

8. The process according to claim 7, further comprising at least two of said improvements i)–vi).

9. The process according to claim 7, further comprising at least three of said improvements i)–vi).

10. The process according to claim 1, wherein said replacing results in a blend of fluids, and wherein said blend has a flash point or a weight average flash point of at least greater than 15° C.

11. The process according to claim 10, wherein said blend has a flash point or a weight average flash point of at least greater than 60° C.

12. The process according to claim 1, wherein said reduction is at least 25%.

13. The process according to claim 1, wherein said reduction is at least 50%.

14. The process according to claim 1, wherein said process is a coating process comprising coating a substrate with a composition comprising at least one fluid which is intended to evaporate.

15. The process according to claim 14, providing a painted substrate.

16. The process according to claim 1, the improvement comprising replacing at least some of said first fluid with dimethyl carbonate.

17. In a non-combustion process utilizing a process fluid comprising a first fluid wherein at least some of said first fluid evaporates into the atmosphere, the improvement comprising adding methyl pivalate to said first fluid, thereby decreasing ozone formation from atmospheric photochemical reactions.

18. The process according to claim 1, wherein said first fluid replaced has an evaporative rate ranging from that of MEK to that of n-butyl acetate, and after said replacing the process fluid has an evaporative rate ranging from that of MEK to that of n-butyl acetate.

19. The process according to claim 17, wherein said process fluid acts as a solvent, carrier, diluent, surface tension modifier, or any combination thereof, in said process.

20. The process according to claim 17, wherein said process fluid does not contain a halocarbon.

21. The process according to claim 17, wherein said decreasing ozone formation is based on a calculation using an OFP scale.

22. The process according to claim 17, wherein said decreasing ozone formation is based on a calculation using the relative MIR scale, using an ROG=3.93.

23. The process according to claim 17, wherein said process is a stationary industrial process.

24. The process according to claim 17, wherein said replacing results in at least one of the following improvements:
   i) an OFP at least 10% less than the OFP of the process fluid prior to said replacing;
   ii) the flash point or a weighted average flash point of the process fluid increasing to above −6.1° C.;
   iii) an increase in toxicity level of the process fluid to at least 2000 mg/kg;
   iv) a measurable decrease in the formation of particulates having a diameter less than 2.5 microns produced by said process;
   v) a change in the evaporative rate of the process fluid into the range of 0.1 to 12 relative to normal butyl acetate;
   vi) a decrease in the decomposition of the process fluid based on reactions with acid catalysts present in said fluid.

25. The process according to claim 24, further comprising at least two of said improvements i)–vi).

26. The process according to claim 24, further comprising at least three of said improvements i)–vi).

27. The process according to claim 17, wherein said replacing results in a blend of fluids, and wherein said blend has a flash point or a weight average flash point of at least greater than 15° C.

28. The process according to claim 27, wherein said blend has a flash point or a weight average flash point of at least greater than 60° C.

29. The process according to claim 21, wherein said replacing results in a reduction in the OFP of the process fluid by at least 10%.

30. The process according to claim 29, wherein said reduction is at least 25%.

31. The process according to claim 29, wherein said reduction is at least 50%.

32. The process according to claim 17, wherein said process is a coating process comprising coating a substrate with a composition comprising at least one fluid which is intended to evaporate.

33. The process according to claim 32, providing a painted substrate.

34. The process according to claim 17, wherein said first fluid replaced is selected from the group consisting of: toluene, xylenes, methanol, ethanol, n-butanol, n-pentanol, isopropyl alcohol, diacetone alcohol, sec-butanol, ethyl acetate, propyl acetate, butyl acetate, isobutyl isobutyrate, isoamyl isobutyrate, propylene glycol methyl ether acetate, methyl ethyl ketone, methyl isobutyl ketone, $C_5$–$C_{10}$ linear ketones, cyclic ketones, halocarbons, methyl t-butyl ether, mineral spirits and a mixture thereof.

35. The process according to claim 17, wherein said first fluid replaced has an evaporative rate ranging from that of MEK to that of n-butyl acetate, and after said replacing the process fluid has an evaporative rate ranging from that of MEK to that of n-butyl acetate.

36. The process according to claim 17, wherein said first fluid is also replaced with dimethyl carbonate.

* * * * *